United States Patent
Bos et al.

[11] Patent Number: 5,902,985
[45] Date of Patent: May 11, 1999

[54] PROVIDING SERVICE TO A VEHICLE

[75] Inventors: Emko Wilhelm Harmannus Maria Bos, Amsterdam; Xavier Frederic Nicolas Marie Deleval, Rotterdam, both of Netherlands; Sicco Dwars, Chester, United Kingdom; Johan Van Der Steen, Amsterdam, Netherlands

[73] Assignee: Shell Oil Company, Houston, Tex.

[21] Appl. No.: 08/821,140

[22] Filed: Aug. 11, 1997

[51] Int. Cl.⁶ .............................. G06F 7/08; G07B 15/02
[52] U.S. Cl. ........................................... 235/384; 235/361
[58] Field of Search .................................... 235/381, 380, 235/382, 492, 384; 340/825.31, 825.85; 342/44, 456, 155

[56] References Cited

U.S. PATENT DOCUMENTS

| | | | |
|---|---|---|---|
| 3,814,148 | 6/1974 | Wostl | 141/98 |
| 4,186,381 | 1/1980 | Fleischer et al. | 340/152 |
| 4,263,945 | 4/1981 | Van Ness . | |
| 4,345,146 | 8/1982 | Story et al. | 235/381 |
| 4,469,149 | 9/1984 | Walkey et al. | 141/94 |
| 4,901,748 | 2/1990 | Shotmeyer | 137/234.6 |
| 5,156,198 | 10/1992 | Hall . | |
| 5,310,999 | 5/1994 | Claus et al. | 235/384 |
| 5,343,906 | 9/1994 | Tibbals, III . | |
| 5,579,233 | 11/1996 | Burns | 364/479.1 |
| 5,596,501 | 1/1997 | Comer et al. | 364/464.23 |

FOREIGN PATENT DOCUMENTS

| | | |
|---|---|---|
| 0 476 858 A1 | 3/1992 | European Pat. Off. . |
| 0 618 557 A1 | 10/1994 | European Pat. Off. . |
| 2 600 318 | 12/1987 | France . |
| 2 224 418 | 5/1990 | United Kingdom . |
| WO 90/12366 | 10/1990 | WIPO . |

OTHER PUBLICATIONS

International Search Report mailed Jul. 18, 1997.

*Primary Examiner*—Thien Minh Le

[57] ABSTRACT

A system is disclosed for providing service to a vehicle (1) positioned at a service site (2) and billing a person or company for the service provided, wherein the vehicle (1) is provided with a vehicle processing unit (10) which includes a receiver-transmitter connected to a vehicle antenna (12) and with element for manually activating the vehicle processing unit, and wherein the service site (2) comprises element for providing service (3), a site processing unit (20) which includes a receiver-transmitter connected to a site antenna (22), which site processing unit includes element for registering the transaction and means for billing the person or company for the service provided, which system further comprises means for automatically correlating the act of servicing the vehicle with the vehicle (1), which element may comprise a passive tag (30) located at the element for providing service (5), element for energizing the passive tag located on the vehicle (1) and a secondary antenna (33) on the vehicle (1) connected to the vehicle processing unit (10).

5 Claims, 1 Drawing Sheet

PROVIDING SERVICE TO A VEHICLE

FIELD OF THE INVENTION

The present invention relates to a system for providing service to a vehicle positioned at a service site and billing a person or company for the service provided. The service provided can be, for example, filling the fuel tank of the vehicle or washing the vehicle.

BACKGROUND TO THE INVENTION

European patent No. 461 888 discloses automatically identifying a vehicle approaching a service site, providing service to the vehicle at the service site, and billing a person or company for the service provided. The known system relies on determining electronically whether an approaching vehicle is stopping for service and on identifying electronically the approaching vehicle as it enters into a service site. To this end the vehicle is provided with a passive tag which is activated by a signal from a site antenna that is always energized. When the service has been provided the transaction is registered and the costs associated with the service are billed.

In the known system, every approaching vehicle is identified, even when the driver passes through the service site in order to visit a shop or a toilet that is present on the premises. Furthermore, special precautions have to be taken to prevent any other nearby service site from identifying the vehicle after it has been identified by the service site where it stops.

The present invention provides a system and a method for providing service to a vehicle positioned at a service site wherein the driver manually starts the process of identifying the vehicle, and wherein in addition the transaction itself is monitored as well.

SUMMARY OF THE INVENTION

To this end the system for providing service to a vehicle positioned at a service site and billing a person or company for the service provided according to the present invention is a system wherein the vehicle is provided with a vehicle processing unit which includes a receiver-transmitter connected to a vehicle antenna and with means for manually activating the vehicle processing unit, and wherein the service site comprises means for providing service, a site processing unit which includes a receiver-transmitter connected to a site antenna, which site processing unit includes means for registering the transaction and means for billing the person or company for the service provided, which system further comprises means for automatically correlating the act of servicing the vehicle with the vehicle.

The invention also relates to a method for providing service to a vehicle positioned at a service site and billing a person or company for the service provided, which method comprises the steps of (a) activating manually the vehicle processing unit which will transmit sufficient data to the site processing unit to allow identifying the vehicle;

(b) allowing service provision to start if the vehicle has been authenticated and authorized;

(c) automatically correlating the act of servicing the vehicle with the vehicle;

(d) stopping service provision and closing the transaction;

(e) registering the transaction, and billing the person or company for the service provided.

DESCRIPTION OF A PREFERRED EMBODIMENT

Figure 1:
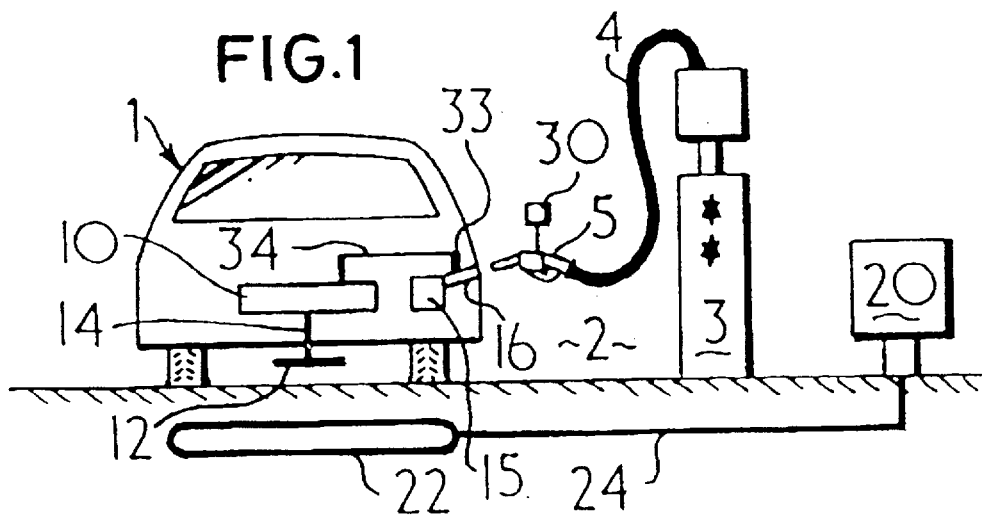
FIG. 1 shows a preferred embodiment of the invention.

Referring now to FIG. 1 a vehicle 1 is parked at a service site 2 provided with means for providing service. In this embodiment, the means for providing service is a fuel pump 3 which is provided with a supply hose 4 and a fill pistol 5.

The vehicle 1 is provided with a vehicle processing unit 10, a vehicle antenna 12, and with means (not shown) for manually activating the vehicle processing unit 10. The antenna 12 is connected by means of an electric conduit 14 to a receiver-transmitter (not shown) which is part of the vehicle processing unit 10. The means for manually activating the vehicle processing unit 10 is for example the vehicle's contact switch, so designed that when the contact is turned off for a predetermined period, for example 10 seconds, the vehicle processing unit 10 is activated.

The vehicle is further provided with a fuel tank 15 having an inlet 16.

The service site 2 comprising the fuel pump 3, further comprises a site processing unit 20 and a site antenna 22. The site antenna 22 is connected to a receiver-transmitter (not shown) which is part of the site processing unit 20 by means of an electric conduit 24. In this case the site antenna 22 is located sub-surface.

The site processing unit is provided with data storage means (not shown) which contain data required to identify and to authenticate the vehicle. The site processing unit also includes means (not shown) for authorizing the vehicle 1, means (not shown) for registering the transaction and means (not shown) for billing the person or company for the service provided.

The system further comprises separate means for automatically correlating the act of servicing the vehicle 1 with the vehicle 1. In this embodiment, the fill pistol 5 is provided with a passive tag 30 and the vehicle 1 is provided with a secondary antenna 33 located on the vehicle 1. The secondary antenna is connected to the vehicle processing unit 10 by means of electric conduit 34. Suitably the secondary antenna 33 is located at or near the inlet 16 of the fuel tank 15 of the vehicle 1. The vehicle 1 is furthermore provided with means (not shown) for energizing the passive tag 30, which means are activated by the vehicle processing unit 10.

During normal operation, the approaching vehicle 1 is not detected. Only when the vehicle 1 has stopped at the service site 2 and when the driver has activated manually the vehicle processing unit 10, a two-way exchange of information between the vehicle processing unit 10 and the site processing unit 20 starts. The two-way exchange of information is done via the respective receivers-transmitters connected to the antennae 12 and 22.

The information from the vehicle processing unit 10 allows the site processing unit 20 to identify the vehicle 1 and subsequently to authenticate it by comparing the data provided by the vehicle processing unit 10 with the relevant data available to the site processing unit 20. When the vehicle 1 has been authenticated, it is authorized.

When the vehicle 1 has been authorized, providing the service can start. In this embodiment the fuel pump 3 is released by the site processing unit 20 for filling the fuel tank 15 of the vehicle 1.

When inserting the fill pistol 5 into the inlet 16 of the fuel tank 15 of the vehicle 1, the means for energizing the passive tag provide energy to activate the passive tag 30 on the filing pistol 5. The signal provided by the activated passive tag 30 is received by the secondary antenna 33 on the vehicle and is passed to the vehicle processing unit 10. From there the information is relayed to the site processing unit 20 via the respective receiver-transmitters and antennae 12 and 22. This information enables the site processing unit 20 to continuously and automatically correlate the act of servicing the vehicle 1 with the vehicle itself. This correlation is done separately from the information exchange needed to authenticate the vehicle.

This provision enables prevention of fraud, and it also reduces the chances of filling the tank with the wrong fuel (for example diesel fuel in the tank of a vehicle provided with an Otto engine).

It is also possible that the site processing unit 20 interrupts supplying fuel when the distance between the passive tag 30 and the secondary antenna 33 exceeds a predetermined distance. In this way spilling of fuel can be prevented, and also fraud can be prevented.

Figure 2:
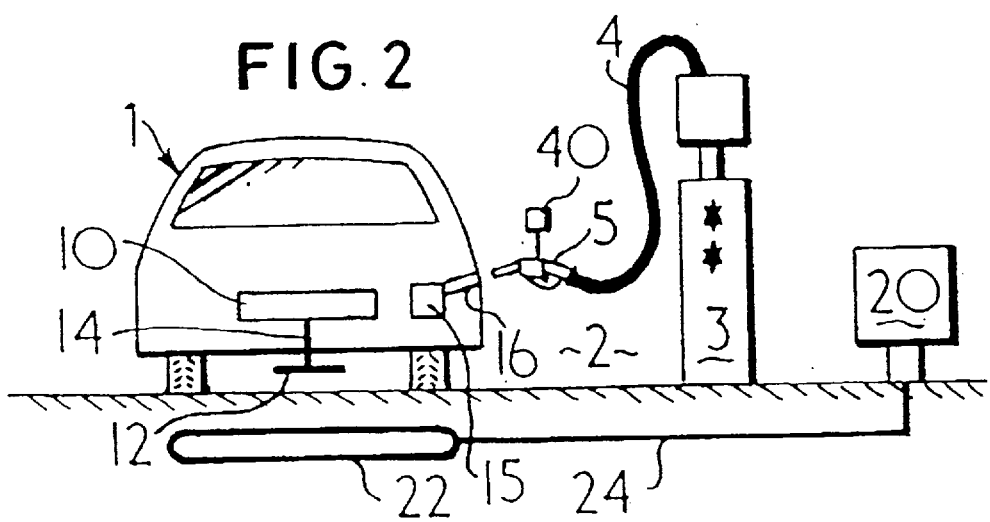
FIG. 2 shows an alternative embodiment of the invention.

Reference is made to FIG. 2 showing an alternative embodiment of the invention. In this alternative embodiment the vehicle 1 is not provided with a secondary antenna. To allow the correlation, the separate means for automatically correlating the act of servicing the vehicle 1 with the vehicle itself comprise an active tag 40 located at the means for providing service, which is in this case the filling pistol 5. The active tag 40 is activated during the provision of the service, filling the fuel tank 15 of the vehicle 1. The unique signal emitted by the active tag 40 is received by the site antenna 22 and passed on to the site processing unit 20, which can so correlate the act of servicing the vehicle 1 with the vehicle itself, separately from authenticating the vehicle.

The above described embodiments can as well be used for a car wash unit in stead of a fuel pump.

Figure 3:
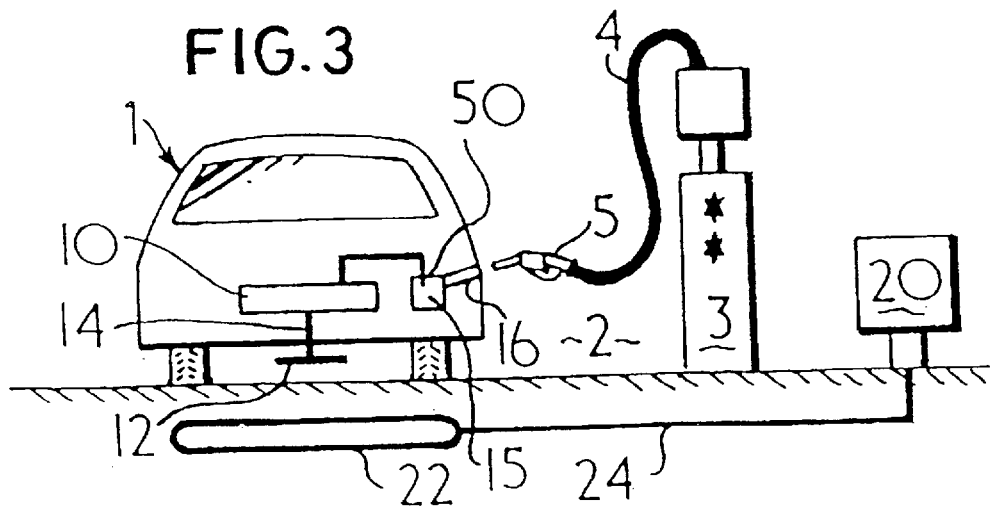
FIG. 3 shows a further alternative embodiment of the invention.

Referring now to FIG. 3, an embodiment of the invention is shown which is only applicable for a fuel pump. In this embodiment the separate means for automatically correlating the act of servicing the vehicle with the vehicle comprise a fuel tank level gauge 50 which is connected to the vehicle processing unit 10. During filling the liquid level in the fuel tank 15 raises and the signal of the fuel tank level gauge 50 is passed on to the site processing unit 20 via the vehicle processing unit 10. In this way the site processing unit can correlate the act of servicing the vehicle 1 with the vehicle itself, separately from authenticating the vehicle.

The vehicle can be provided with a credit card reading-writing unit (not shown) which allows billing the costs for the service provided by means of the normal routine of paying by means of a credit card. In place of the credit card, a chip card can be used or a pre-charged electronic purse.

The data transmitted by the vehicle processing unit may include odometer readings. It can also include vehicle status information.

The site processing unit 20 contains information on products and associated costs and on services and associated costs. It can further contain customer details, traffic- and weather information, and routing information. This information can be passed on to the vehicle processing unit and the costs will be charged. Furthermore the site processing unit may contain a facility for electronic mail which the driver can use through his vehicle processing unit.

If required, the two-way communication between the vehicle processing unit and the site processing unit may be in the form of coded or encrypted communication.

The communication can be done by means of inductive loop communication or by means of radio communication.

We claim:

1. A system for providing service to a vehicle positioned at a service site and billing for the service provided, the vehicle having an antenna, the system comprising:

a vehicle processing unit operatively associated with the vehicle;

a receiver-transmitter with capability to communicate with the vehicle processing unit;

an antenna located on the vehicle, the antenna connected to the receiver-transmitter and effective to transmit signals to and from the receiver-transmitter;

a manual activating means effective to activate the vehicle processing unit upon manual input from within the vehicle and initiate sending of a signal requesting services to the receiver-transmitter;

a service site comprising means for providing service;

a site processing unit located at the service site;

a site receiver-transmitter with capability to communicate with the site processing unit a site antenna, the site antenna connected to the site receiver-transmitter and effective to transmit signals to and from the receiver-transmitter wherein service can be provided to a vehicle upon receipt of a signal requesting such service from the manual input to the vehicle processing unit and through the vehicle antenna, the site antenna, the site receiver-transmitter, and the site processing unit;

a means for registering the transaction with the site processing unit;

a means for billing for the service provided based on information registered on the site processing unit; and a means for automatically correlating the act of servicing the vehicle with the vehicle.

2. The system of claim 1, wherein the means for automatically correlating the act of servicing the vehicle with the vehicle comprise a passive tag located at the means for providing service, and on the vehicle means for energizing the passive tag and a secondary antenna connected to the vehicle processing unit.

3. The system of claim 1, wherein the means for automatically correlating the act of servicing the vehicle with the vehicle comprise an active tag located at the means for providing service, which tag is activated during the provision of the service.

4. The system of claim 1, wherein the means for providing service is a fuel pump, and wherein the means for automatically correlating the act of servicing the vehicle with the vehicle comprise a fuel tank level gauge connected to the vehicle processing unit.

5. A method for providing service to a vehicle positioned at a service site and billing for the service provided, comprising the steps of (a) activating manually the vehicle processing unit which will transmit sufficient data to the site processing unit to allow identifying the vehicle;

(b) determining, in a site processing unit, that the vehicle processing unit has been activated, and determining if service to the vehicle is authorized;

(c) allowing service provision to start if the vehicle has been authenticated and authorized;

(d) automatically correlating the act of servicing the vehicle with the vehicle;

(e) stopping service provision and closing the transaction;

(f) registering the transaction, and billing for the service provided.

* * * * *